United States Patent
Opu et al.

(10) Patent No.: US 10,957,928 B2
(45) Date of Patent: Mar. 23, 2021

(54) METHOD FOR MEASURING AND CONTROLLING METHANOL CONCENTRATION IN A METHANOL FUEL CELL

(71) Applicant: Oorja Corporation, Fremont, CA (US)

(72) Inventors: Md Opu, Fremont, CA (US); Rajinder Singh, Sunnyvale, CA (US); Jeff Henderson, Campbell, CA (US); Aditya Koparkar, Fremont, CA (US)

(73) Assignee: Oorja Corporation, Fremont, CA (US)

( * ) Notice: Subject to any disclaimer, the term of this patent is extended or adjusted under 35 U.S.C. 154(b) by 351 days.

(21) Appl. No.: 15/735,501

(22) PCT Filed: Jun. 10, 2016

(86) PCT No.: PCT/US2016/036989
§ 371 (c)(1),
(2) Date: Dec. 11, 2017

(87) PCT Pub. No.: WO2016/201302
PCT Pub. Date: Dec. 15, 2016

(65) Prior Publication Data
US 2018/0159155 A1    Jun. 7, 2018

Related U.S. Application Data

(60) Provisional application No. 62/175,096, filed on Jun. 12, 2015.

(51) Int. Cl.
| | | |
|---|---|---|
| H01M 8/00 | (2016.01) |
| H01M 8/04791 | (2016.01) |
| H01M 8/1011 | (2016.01) |
| H01M 8/04186 | (2016.01) |
| H01M 8/0444 | (2016.01) |
| G06F 9/46 | (2006.01) |
| H01M 8/1004 | (2016.01) |

(52) U.S. Cl.
CPC ......... *H01M 8/04798* (2013.01); *G06F 9/46* (2013.01); *H01M 8/04194* (2013.01); *H01M 8/04447* (2013.01); *H01M 8/1004* (2013.01); *H01M 8/1011* (2013.01); *Y02E 60/50* (2013.01)

(58) Field of Classification Search
CPC ............ H01M 8/1011; H01M 8/1004; H01M 8/04194; H01M 8/04798; Y02E 60/523
See application file for complete search history.

(56) References Cited

U.S. PATENT DOCUMENTS

| | | |
|---|---|---|
| 6,321,145 B1 | 11/2001 | Rajashekara |
| 2006/0141307 A1 | 6/2006 | Ryoichi et al. |

(Continued)

FOREIGN PATENT DOCUMENTS

| | | |
|---|---|---|
| CN | 1967920 A | 5/2007 |
| CN | 1973393 A | 5/2007 |

*Primary Examiner* — Cynthia H Kelly
*Assistant Examiner* — Monique M Wills
(74) *Attorney, Agent, or Firm* — Rimon PC

(57) ABSTRACT

Methods for measuring and controlling the methanol concentration in a methanol fuel cell such as a direct methanol fuel cell or fuel cell stack are disclosed. Processors and memory storage containing programs which execute instructions to control the methanol concentration in the fuel cell or fuel cell stack are also disclosed.

16 Claims, 7 Drawing Sheets

(56) References Cited

U.S. PATENT DOCUMENTS

| | | | |
|---|---|---|---|
| 2007/0212581 A1* | 9/2007 | Kanai | H01M 8/04186 429/429 |
| 2013/0130141 A1* | 5/2013 | Matsuda | H01M 8/04186 429/429 |
| 2014/0017586 A1* | 1/2014 | Choi | H01M 8/04447 429/449 |

* cited by examiner

Algorithm during Startup

US 10,957,928 B2

METHOD FOR MEASURING AND CONTROLLING METHANOL CONCENTRATION IN A METHANOL FUEL CELL

CROSS-REFERENCE TO RELATED APPLICATIONS

The present application is the US national phase application of international application PCT/CN2016/036989 filed on Jun. 10, 2016 and titled Method for Measuring and Controlling Methanol Concentration in a Methanol Fuel Cell, which claims priority to U.S. provisional patent application No. 62/175,096 filed on Jun. 12, 2015, the entire content of both being incorporated hereby by reference.

TECHNICAL FIELD

Methods for measuring and controlling the methanol concentration in a methanol fuel cell such as a direct methanol fuel cell or fuel cell stack are disclosed. Methods for controlling the start-up of a direct methanol fuel cell or fuel cell stack are also disclosed. Processors and memory storage containing programs which execute instructions to (i) control the methanol concentration in the fuel cell or fuel cell stack and/or (ii) control the start-up of a fuel cell or fuel cell stack are also disclosed.

BACKGROUND OF THE INVENTION

A direct methanol fuel cell (DMFC) has an anode, a cathode and an electrolyte interposed between the anode and the cathode. In fuel cells, electricity is produced from the electrochemical reactions which take place at the anode and the cathode. At the anode, methanol is electrochemically oxidized with water to produce electrons, protons and carbon dioxide. The electrons travel through an external electronic circuit to the cathode. At the cathode, oxygen electrochemically reacts with electrons and protons, which migrate through the electrolyte from the anode to cathode. During these electrochemical reactions, electrons pass through an external circuit and may be used as an energy source for electronic devices. The electrolyte used in the direct methanol fuel cell can be acidic or basic. An acidic proton exchange membrane (PEM) such as the perfluorosulfonic acid (PFSA) membrane Nafion produced by DuPont may be used as an electrolyte for the DMFC.

A DMFC system also has a fuel tank for storing concentrated or pure methanol, and supplies a mixture of methanol and water as fuel to the anode. The methanol can crossover (a phenomenon in which fuel passes through the membrane) through Nafion and other PEMs if the concentration of methanol is high in the mixture. This fuel crossover increases as a function of temperature, concentration of methanol and the thickness of the PEM. For example, higher operating temperature, higher fuel concentration, and thinner (or higher conductance) PEMs increase the fuel crossover rate. The higher fuel crossover causes negative effects on fuel utilization, performance, and durability.

Fuel concentration is an important factor affecting the performance of a fuel cell. Therefore, controlling the fuel concentration is necessary to ensure optimum performance and proper fuel utilization by the fuel cell.

Many methods have been used to determine the concentration of methanol in the mixture of methanol and water which is fed to the anode. In one such method, a small amount of the methanol mixture is separated and heated until boiling, and the boiling point is measured to determine the fuel concentration. Other methods include measuring the capacitance of the methanol mixture, the speed of sound in the methanol mixture, the refractive index of the methanol mixture, the heat capacity of the methanol mixture, the viscosity of the methanol mixture, the kinematic viscosity of the methanol mixture and the electrochemical properties of the methanol mixture. An example of the latter is disclosed in US Patent Publication 2012/0009495.

Many of these methods are time consuming and require the use of complex and/or expensive equipment. Further, the reliability of some of such methods to accurately measure methanol concentration due to potential measurement errors has been called into question. See *Investigation of Direct Methanol Fuel Cell Voltage Response for Methanol Concentration Sensing* by William J. Harrison, Master of Science Thesis, University of Florida, 2012: http://ufdc.ufl.edu/UFE0044418/00001.

Accordingly, there is a need for methods and means to reliably measure and control the methanol concentration in methanol mixtures in DMFCs in a manner that reduces the cost and complexity of manufacture of the DMFC. An additional benefit of stably controlling the methanol concentration is improved durability of the fuel cell or fuel cell stack.

SUMMARY OF THE INVENTION

Instead of measuring one parameter of the methanol mixture in a DMFC to determine the methanol concentration, in most embodiments, two methanol concentration dependent parameters are used to measure two methanol concentrations. An algorithm analyzes the two methanol concentrations to adjust the methanol concentration in a methanol mixing chamber in the DMFC.

More particularly, in one embodiment the DMFC has a methanol concentration set point for its operation. The method comprises (1) measuring a first methanol concentration of a DMFC by measuring a first methanol concentration dependent parameter of the DMFC; (2) measuring a second methanol concentration of the DMFC by measuring a second methanol concentration dependent parameter of said DMFC which is different from said first parameter; (3) determining the difference between first and second methanol concentrations to generate a positive or negative offset concentration; (4) adding the positive or negative offset concentration to the first methanol concentration to produce an adjusted methanol concentration; (5) comparing the adjusted methanol concentration to methanol concentration set point; and (6) increasing the methanol concentration in a methanol mixing chamber in the DMFC if the adjusted methanol concentration is less than the methanol concentration set point by transferring methanol from a methanol source to the methanol mixing chamber. This overall method is set forth in the algorithm set forth in FIG. 1.

In another embodiment, the method comprises (1) measuring a first methanol concentration of a DMFC by measuring a first methanol concentration dependent parameter of the DMFC; (2) determining if the first methanol concentration is less than the methanol concentration set point; (3) increasing the methanol concentration in the methanol mixing chamber if the first methanol concentration is less than the methanol concentration set point by transferring methanol from a methanol source to the methanol mixing chamber; (4) measuring a second methanol concentration of the DMFC by measuring a second methanol concentration dependent parameter of said DMFC which is different from said first parameter; (5) determining the difference between first and second methanol concentrations to generate a positive or negative offset concentration; (6) adding the positive or negative offset concentration to the first methanol concentration to produce an adjusted methanol concentration; (7) comparing the adjusted methanol concentration to methanol concentration set point; and (8) increasing the methanol concentration in a methanol mixing chamber in the DMFC if the adjusted methanol concentration is less than the methanol concentration set point. This overall method is set forth in the algorithm set forth in FIG. 2.

In yet another embodiment, the method comprises (1) measuring a first methanol concentration of a DMFC by measuring a first methanol concentration dependent parameter of said DMFC; (2) determining if the first methanol concentration is less than the methanol concentration set point; (3) increasing the methanol concentration in a methanol mixing chamber in the DMFC if the first methanol concentration is less than the methanol concentration set point by transferring methanol from a methanol source to the methanol mixing chamber; (4) measuring a second methanol concentration of the DMFC by measuring a second methanol concentration dependent parameter of the DMFC which is different from the first parameter; (5) determining if the second methanol concentration is less than the methanol concentration set point to generate a positive or negative offset concentration; (6) adding the positive or negative offset concentration to the first methanol concentration to produce an adjusted methanol concentration; (6) comparing the adjusted methanol concentration to the methanol concentration set point; and (7) increasing the methanol concentration in the methanol mixing chamber if the adjusted methanol concentration is less than the methanol concentration set point by transferring methanol from the methanol source to the methanol mixing chamber. This overall method is set forth in the algorithm set forth in FIG. 3.

In another embodiment, the method uses one methanol concentration dependent parameter of the DMFC to control the methanol concentration, namely the anode outlet temperature. The method comprises (1) measuring a methanol concentration of the DMFC by measuring the anode outlet temperature of the DMFC; (2) determining if the methanol concentration is less than the methanol concentration set point; and (3) increasing the methanol concentration in a methanol mixing chamber in the DMFC if the methanol concentration is less than the methanol concentration set point.

In each of the foregoing embodiments, the calculated methanol concentration may be greater than the methanol concentration set point in which case the transfer of methanol from the methanol source to the methanol mixing chamber can be restricted or water, such as that produced at the cathode, can be added to the methanol mixing chamber.

The foregoing embodiments are generally followed during normal operation of the DMFC. The following embodiment is used during start-up of the DMFC. The method for starting a direct methanol fuel cell (DMFC) uses several components of the DMFC including (i) an anode loop comprising at least one anode, an anode circulation pump, a methanol mixing chamber and a methanol mixture in the anode loop, (ii) a methanol source and a methanol pump in fluid communication with the methanol source and the methanol mixing chamber, (iii) at least one cathode and an oxidant gas pump in fluid communication with the at least one cathode, (iv) a methanol mixture temperature sensor and (v) an anode outlet temperature sensor. The method has two objectives: (i) to bring the DMFC to its operational voltage or greater and (ii) to bring the methanol mixture to its operational temperature without damaging the anode of the DMFC with an excessive methanol concentration. The method comprises:

(a) activating the anode circulation pump in the anode loop to circulate the methanol mixture;

(b) activating the oxidant gas pump to feed oxidant gas to the at least one cathode;

(c) activating the methanol pump for a first on-off time (duty cycle) to transfer methanol from the methanol source to the methanol mixing chamber thereby increasing the concentration of methanol in the methanol mixture in the anode loop;

(d) measuring the open circuit voltage (OCV) of the DMFC;

(e) reactivating the methanol pump for a repeat duty cycle if the OCV is below a predetermined voltage to increase the concentration of methanol in the methanol mixture and if necessary repeating the reactivating and measuring of the OCV until the OCV reaches (i) the predetermined voltage or greater or optionally (ii) a preset number of times after which the starting of the DMFC is discontinued;

(f) applying a load to the DMFC after the OCV of the DMFC reaches the predetermined voltage to generate a current and heat;

(g) measuring the temperature of the methanol mixture to determine if it has reached a first predetermined temperature or greater in which case normal operation is commenced;

(h) activating the methanol pump for a second duty cycle if the temperature of the methanol mixture is below the first predetermined temperature (i) measuring the temperature of the methanol mixture to determine if it is below a second predetermined temperature which is less than said first predetermined temperature;

(j) measuring the anode outlet temperature;

(k) subtracting the methanol mixture temperature from the anode outlet temperature from step (i) to determine the temperature difference;

(l) reducing the duty cycle if the methanol mixture temperature of step (i) is below the second predetermined temperature and the temperature difference of step (k) is above a third predetermined temperature; and (m) repeating step (g) if the methanol mixture temperature of step (i) is above said second predetermined temperature or the temperature difference of step (k) is below a third predetermined temperature.

In other embodiments, the above methods are performed by an apparatus having one or more processors and memory storing programs executed by the one or more processors where one or more of the programs include instructions for carrying out the methods disclosed herein.

Another embodiment is an apparatus comprising one or more processors, memory; and one or more programs, wherein the one or more programs are stored in the memory and are configured to be executed by the one or more processors, where the one or more programs including instructions for carrying out the methods disclosed herein.

Another embodiment is a non-transitory computer readable storage medium storing one or more programs, the one or more programs comprising instructions, which when executed by an apparatus with one or more processors, causes the apparatus to execute instructions for carrying out the methods disclosed herein.

Another embodiment is a fuel cell system comprising a direct methanol fuel cell (DMFC) and the above described apparatus for carrying out the methods disclosed herein.

Another embodiment is a battery range extender comprising the fuel cell system of claim described above and one or more batteries.

Another embodiment is a vehicle comprising the battery range extender described above.

DETAILED DESCRIPTION

As used herein, a direct methanol fuel cell (DMFC) refers to a fuel cell which includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). Several fuel cells are typically combined in a fuel cell stack to generate the desired power. For example, a typical fuel cell stack for a vehicle may have two hundred or more stacked fuel cells. The fuel cell stack receives a cathode input reactant gas, typically a flow of air forced through the stack by a compressor. Not all of the oxygen is consumed by the stack and some of the air is output as a cathode exhaust gas that may include water as a stack by-product. The fuel cell stack also receives a methanol mixture from a methanol mixing chamber that flows into the anode side of the stack. In addition, the DMFC has a source of methanol which is in fluid communication with the methanol mixing chamber.

The fuel cell stack can include a series of bipolar plates positioned between the several MEAs in the stack, where the bipolar plates and the MEAs are positioned between the two end plates. The bipolar plates include an anode side and a cathode side for adjacent fuel cells in the stack. Anode methanol flow channels are provided on the anode side of the bipolar plates that allow the methanol mixture to flow to the respective MEA. Cathode gas flow channels are provided on the cathode side of the bipolar plates that allow the cathode reactant gas to flow to the respective MEA. One end plate includes anode methanol flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates can also include flow channels through which a cooling fluid flows.

It is to be understood that DMFC refers a direct methanol fuel cell with one MEA which can be used to power small electronic devices as well as a direct methanol fuel cell stack which provides higher output to power larger electronic devices and vehicles.

Figure 4:
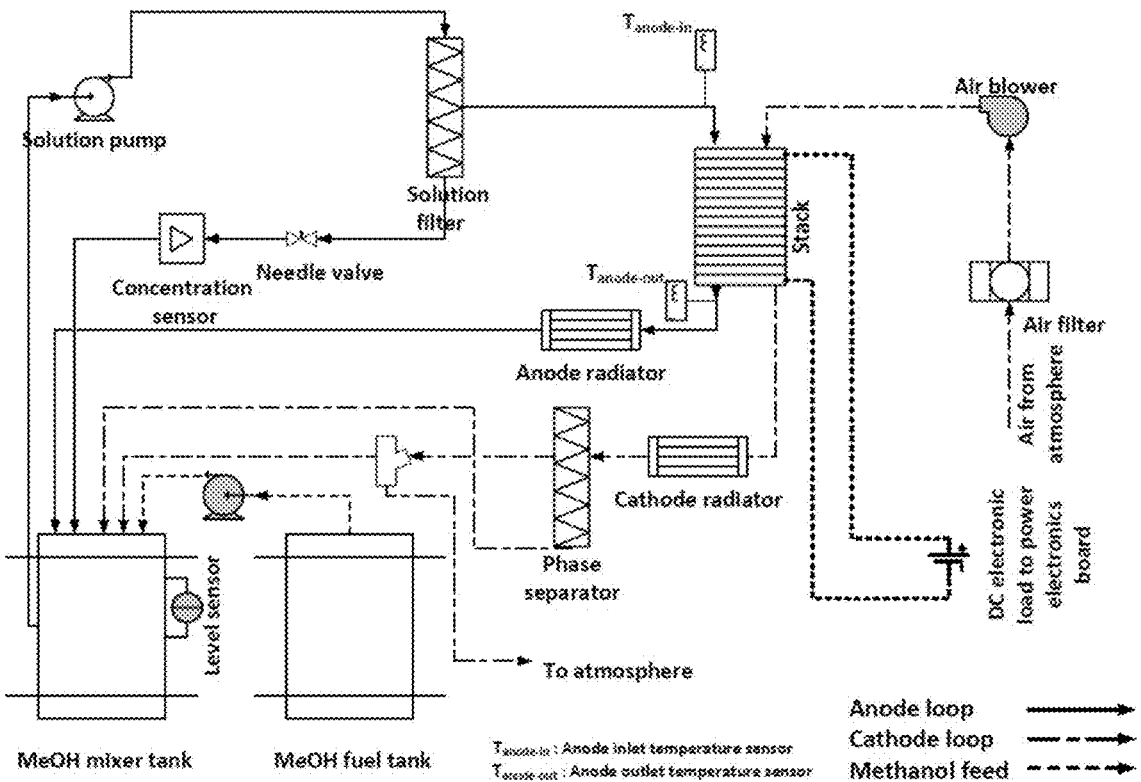
FIG. 4 is a schematic diagram of one embodiment of a DMFC.

FIG. 4 is a schematic drawing of one embodiment of a DMFC. The DMFC includes a DMFC stack with cathode and anode loops to supply oxidant (air or oxygen) and methanol, respectively. A methanol fuel tank is in fluid communication with a methanol mixing tank which in turn is in fluid communication with the anode loop. A pump can be positioned between the methanol fuel tank (source) and the methanol mixing chamber. The pump can have a fixed flow rate in which case the amount of methanol transferred is controlled by the length of time the pump is on. If it is a variable speed pump, the methanol transfer can be controlled by pump rate as well as time of operation. Gravity feed is also possible in which case the methanol transfer can be controlled by a valve or other know mechanism. A cathode radiator is positioned in the cathode loop downstream from the cathode exhaust outlet and can be vented to the atmosphere or directed to the methanol mixing chamber. The cathode radiator can be activated to condense water from the cathode exhaust. This cathode produced water can be used to dilute the methanol in the methanol mixing chamber if the methanol concentration is too high. It can also be used alone or in combination with methanol transfer from the methanol source to raise the fluid level to a predetermined level in the methanol mixing tank when the fluid level sensor in the methanol mixing tank fall below a predetermined level. Also shown in as anode outlet temperature sensor.

As used herein, the term "methanol mixture" refers to the methanol fuel that is feed to the anode of the DMFC. Pure methanol is 24.9 M. In most DMFC applications this is too high and requires dilution with water to between 0.6 M and 1.2 M. In the preferred embodiments, a methanol source, such as a tank, contains pure methanol. In other embodiments, the methanol in the methanol source has a concentration that is higher that the methanol concentration set point for operation of the DMFC so that it can increase the methanol concentration of the methanol mixture when introduced into the methanol mixing chamber.

It is also to be understood that reference to the measurement of first and second methanol concentrations correlates with the measured methanol concentration in the methanol mixture.

As used herein a "methanol concentration dependent parameter" of a DMFC refers to any parameter of the DMFC which varies based on the methanol mixture concentration. Such parameters include (1) open circuit voltage (OCV) decay slope, (2) the capacitance of the methanol mixture, (3) the speed of sound in the methanol mixture, (4) the refractive index of the methanol mixture, (5) the heat capacity of said methanol mixture, (6) the viscosity of the methanol mixture, (6) the kinematic viscosity of the methanol mixture and (7) the electrochemical properties of the methanol mixture. These methanol sensing technologies are disclosed in *Investigation of Direct Methanol Fuel Cell Voltage Response for Methanol Concentration Sensing* by William J. Harrison, Master of Science Thesis, University of Florida, 2012: http://ufdc.ufl.edu/UFE0044418/00001 (Harrison), incorporated by reference in its entirety. See in particular pages 21-28 and pages 29-51.

Figure 5:
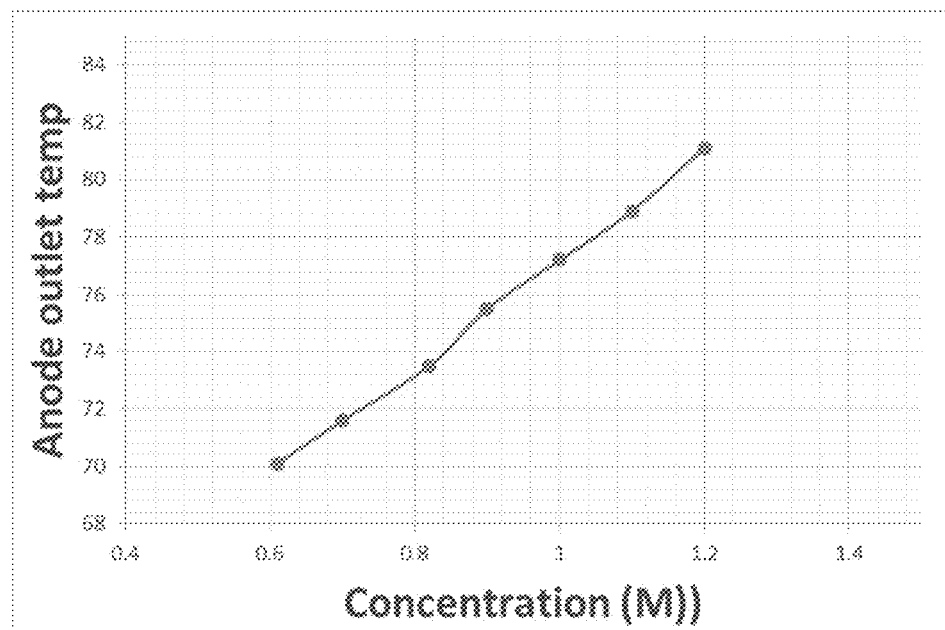
FIG. 5 shows the dependency of anode outlet temperature on methanol concentration.

Another methanol concentration dependent parameter is anode outlet temperature. FIG. 5 shows the correlation between anode outlet temperature and methanol concentration.

Figure 1:
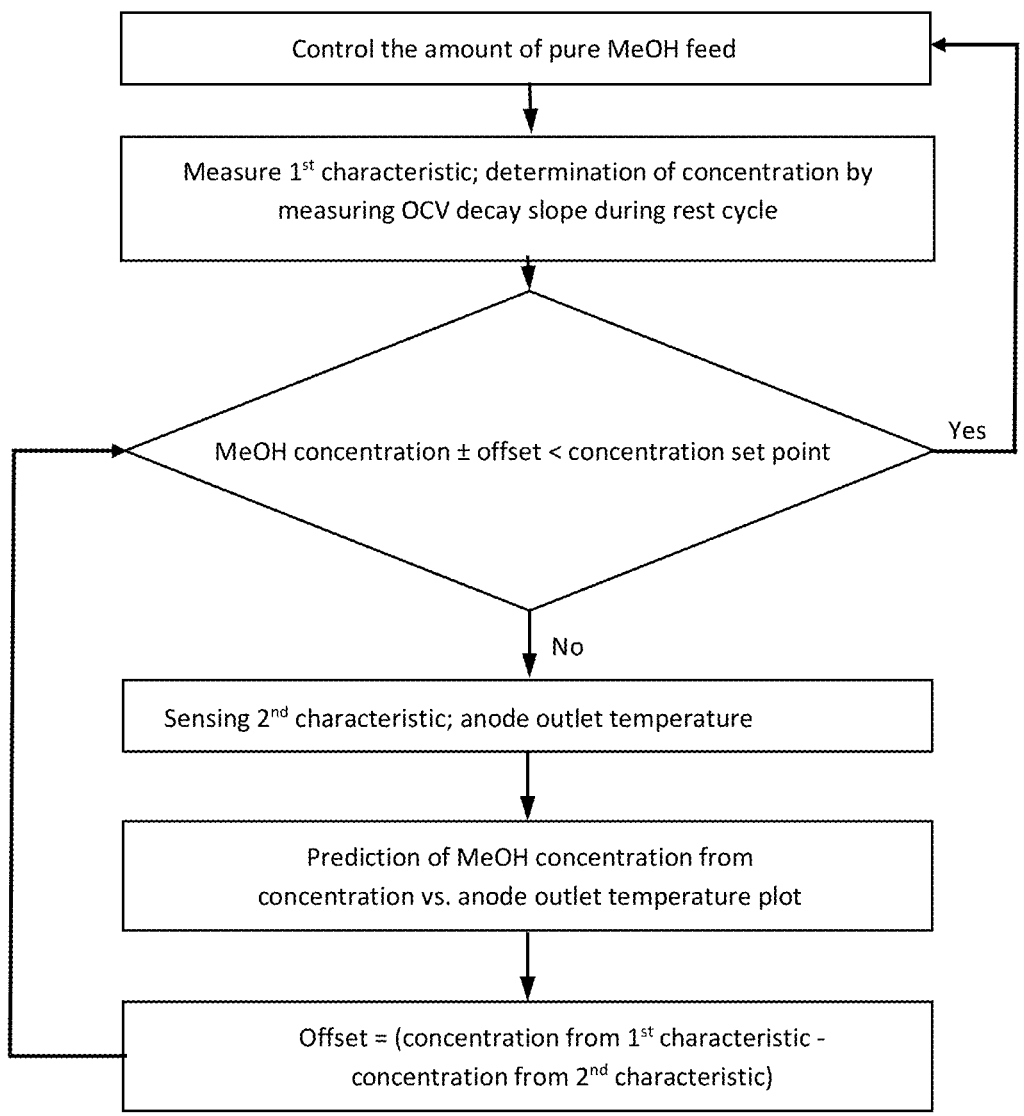
FIG. 1 is an algorithm disclosing an embodiment to measure and control the methanol concentration in a DMFC.

As previously indicted, a first embodiment comprises (1) measuring a first methanol concentration of a DMFC by measuring a first methanol concentration dependent parameter of the DMFC; (2) measuring a second methanol concentration of the DMFC by measuring a second methanol concentration dependent parameter of said DMFC which is different from said first parameter; (3) determining the difference between first and second methanol concentrations to generate a positive or negative offset concentration; (4) adding the positive or negative offset concentration to the first methanol concentration to produce an adjusted methanol concentration; (5) comparing the adjusted methanol concentration to methanol concentration set point; and (6) increasing the methanol concentration in a methanol mixing chamber in the DMFC if the adjusted methanol concentration is less than the methanol concentration set point by transferring methanol from a methanol source to the methanol mixing chamber. This overall method is set forth in the algorithm set forth in FIG. 1.

In this embodiment, the concentration of methanol in the methanol mixture is measured using two different methanol concentration dependent parameters. The difference is determined (if any) and the difference is added to the first methanol mixture concentration. That adjusted methanol mixture concentration is then compared to the DMFC's methanol concentration set point. If it is below the set point methanol is transferred from the source to the methanol mixing chamber.

If the adjusted methanol concentration is above the concentration set point, methanol transfer to the methanol mixing chamber can be restricted. Restricted methanol transfer from the source to the methanol mixing chamber means a reduction in the amount of methanol transferred or the complete stoppage of such transfer. Alternatively, water from a water tank or cathode water can be transferred to the methanol mixer if the concentration is above the methanol set point to reduce the concentration.

The transfer of methanol and/or water to adjust the methanol mixture concentration is this embodiment is also applicable the other disclosed embodiments.

In this and the other embodiments the first and second methanol concentration dependent parameters are preferably selected from anode outlet temperature and OCV decay slope. More preferably, the first parameter is anode outlet temperature and the second parameter is OCV decay slope. This later embodiment provides for continuous concentration monitoring using anode outlet temperature and periodic concentration monitoring by OCV decay slope measurement during periodic rest cycles.

Figure 2:
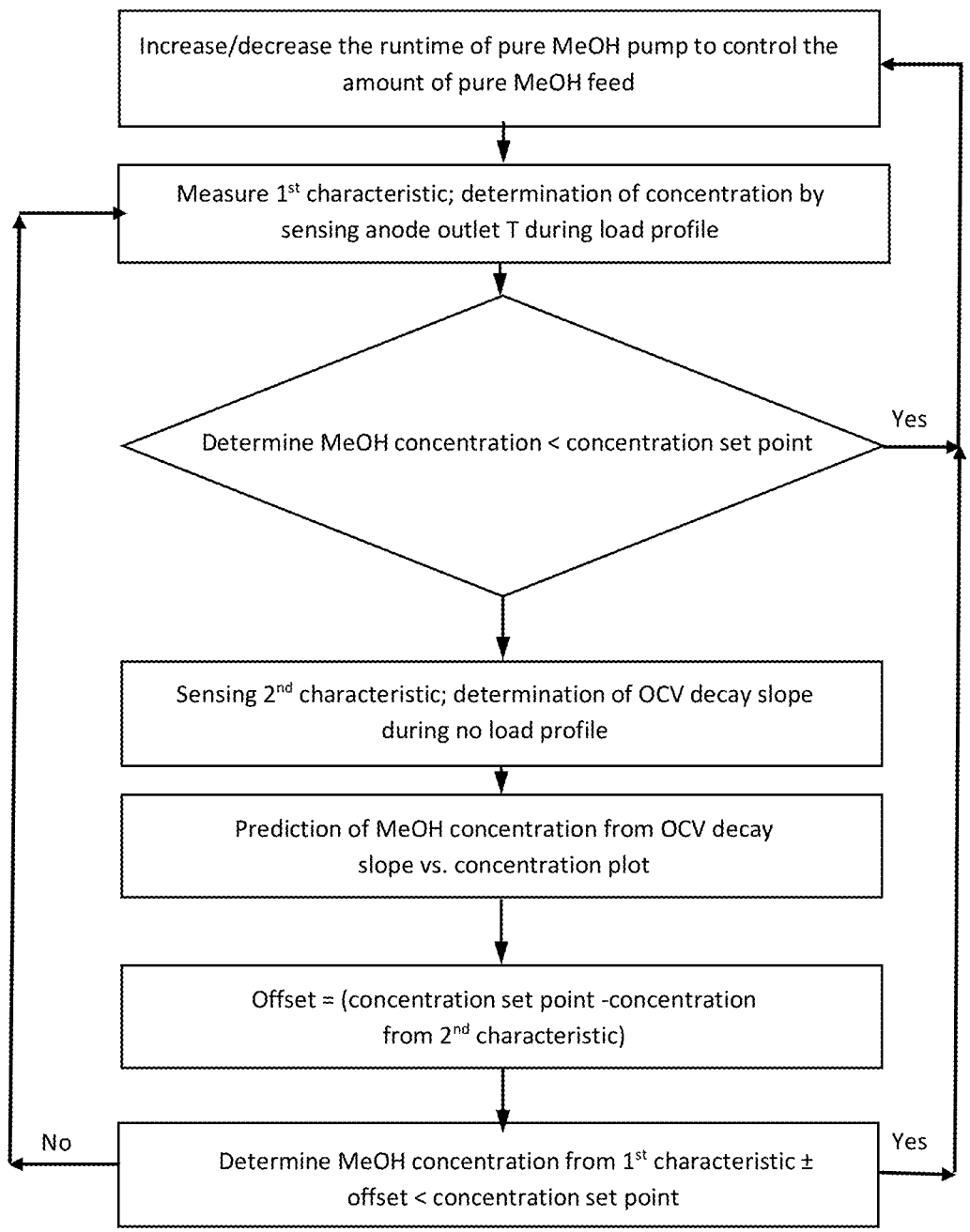
FIG. 2 is an algorithm disclosing another embodiment to measure and control the methanol concentration in a DMFC.

A second embodiment comprises (1) measuring a first methanol concentration of a DMFC by measuring a first methanol concentration dependent parameter of the DMFC; (2) determining if the first methanol concentration is less than the methanol concentration set point; (3) increasing the methanol concentration in the methanol mixing chamber if the first methanol concentration is less than the methanol concentration set point by transferring methanol from a methanol source to the methanol mixing chamber; (4) measuring a second methanol concentration of the DMFC by measuring a second methanol concentration dependent parameter of said DMFC which is different from said first parameter; (5) determining the difference between first and second methanol concentrations to generate a positive or negative offset concentration; (6) adding the positive or negative offset concentration to the first methanol concentration to produce an adjusted methanol concentration; (7) comparing the adjusted methanol concentration to methanol concentration set point; and (8) increasing the methanol concentration in a methanol mixing chamber in the DMFC if the adjusted methanol concentration is less than the methanol concentration set point. This overall method is set forth in the algorithm set forth in FIG. 2.

This embodiment contains the steps of the first embodiment plus additional steps. In this embodiment, the first methanol mixture concentration is compared to the methanol concentration set point. If it is less than the set point, methanol is transferred to the methanol mixing chamber to increase the concentration. If the methanol concentration is above the concentration set point, water is transferred to the methanol mixing chamber. The remainders of the steps are the same as in the first embodiment.

Figure 3:
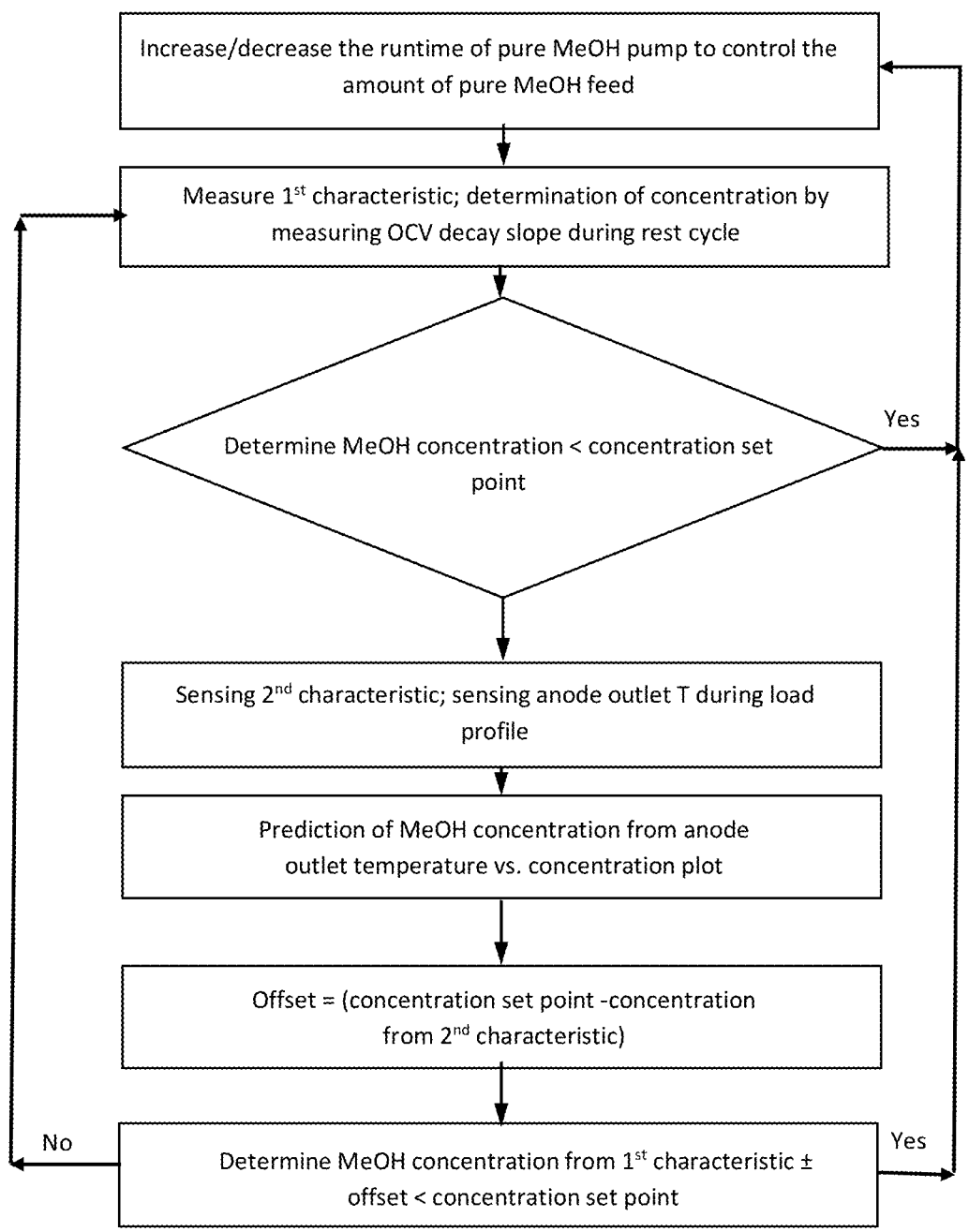
FIG. 3 is an algorithm disclosing still another embodiment to measure and control the methanol concentration in a DMFC.

In a third embodiment, the method comprises (1) measuring a first methanol concentration of a DMFC by measuring a first methanol concentration dependent parameter of said DMFC; (2) determining if the first methanol concentration is less than the methanol concentration set point; (3) increasing the methanol concentration in a methanol mixing chamber in the DMFC if the first methanol concentration is less than the methanol concentration set point by transferring methanol from a methanol source to the methanol mixing chamber; (4) measuring a second methanol concentration of the DMFC by measuring a second methanol concentration dependent parameter of the DMFC which is different from the first parameter; (5) determining if the second methanol concentration is less than the methanol concentration set point to generate a positive or negative offset concentration; (6) adding the positive or negative offset concentration to the first methanol concentration to produce an adjusted methanol concentration; (6) comparing the adjusted methanol concentration to the methanol concentration set point; and (7) increasing the methanol concentration in the methanol mixing chamber if the adjusted methanol concentration is less than the methanol concentration set point by transferring methanol from the methanol source to the methanol mixing chamber. This overall method is set forth in the algorithm set forth in FIG. 3.

The first part of this embodiment is the same as the second embodiment through step 4. It differs from the second embodiment in that the second methanol concentration is not compared to the first concentration. Rather, the second methanol concentration is compared to the methanol concentration set point. This generates an offset that is then applied to the first methanol concentration to generate an adjusted methanol concentration. That adjusted concentration is then compared to the concentration set point. Methanol is transferred to the mixing chamber if the adjusted concentration is below the set point. If above the set point, methanol transfer is restricted and/or water is transferred to the mixing chamber.

In another embodiment, the method uses one methanol concentration dependent parameter of the DMFC to control the methanol concentration, namely the anode outlet temperature. The method comprises (1) measuring a methanol mixture concentration of the DMFC by measuring the anode outlet temperature of the DMFC; (2) determining if the methanol mixture concentration is less than the methanol concentration set point; and (3) increasing the methanol mixture concentration in a methanol mixing chamber in the DMFC if the methanol concentration is less than the methanol concentration set point.

As with the other embodiments, if the methanol concentration is above the concentration set point, water transfer to the methanol mixing chamber is restricted and/or water is transferred to the mixing chamber.

The foregoing embodiments are generally followed during normal operation of the DMFC. The following embodiment is used during start-up of the DMFC. The method for starting a direct methanol fuel cell (DMFC) uses several components of the DMFC including (i) an anode loop comprising at least one anode, an anode circulation pump, a methanol mixing chamber and a methanol mixture in the anode loop, (ii) a methanol source and a methanol pump in fluid communication with the methanol source and the methanol mixing chamber, (iii) at least one cathode and an oxidant gas pump in fluid communication with the at least one cathode, (iv) a methanol mixture temperature sensor and (v) an anode outlet temperature sensor. The method has two objectives: (i) to bring the DMFC to its operational voltage or greater and (ii) to bring the methanol mixture to its operational temperature without damaging the anode of the DMFC with an excessive methanol concentration.

The method comprises:

(a) activating the anode circulation pump in the anode loop to circulate the methanol mixture;

(b) activating the oxidant gas pump to feed oxidant gas to the at least one cathode;

(c) activating the methanol pump for a first on-off time (duty cycle) to transfer methanol from the methanol source to the methanol mixing chamber thereby increasing the concentration of methanol in the methanol mixture in the anode loop;

(d) measuring the open circuit voltage (OCV) of the DMFC;

(e) reactivating the methanol pump for a repeat duty cycle if the OCV is below a predetermined voltage to increase the concentration of methanol in the methanol mixture and if necessary repeating the reactivating and measuring of the OCV until the OCV reaches (i) the predetermined voltage or greater or optionally (ii) a preset number of times after which the starting of the DMFC is discontinued;

(f) applying a load to the DMFC after the OCV of the DMFC reaches the predetermined voltage to generate a current and heat;

(g) measuring the temperature of the methanol mixture to determine if it has reached a first predetermined temperature or greater in which case normal operation is commenced;

(h) activating the methanol pump for a second duty cycle if the temperature of the methanol mixture is below the first predetermined temperature (i) measuring the temperature of the methanol mixture to determine if it is below a second predetermined temperature which is less than said first predetermined temperature;

(j) measuring the anode outlet temperature;

(k) subtracting the anode outlet temperature from the methanol mixture temperature from step (i) to determine the temperature difference;

(l) reducing the duty cycle if the methanol mixture temperature of step (i) is below the second predetermined temperature and the temperature difference of step (k) is above a third predetermined temperature; and (m) repeating step (g) if the methanol mixture temperature of step (i) is above said second predetermined temperature or the temperature difference of step (k) is below a third predetermined temperature.

Figure 9:
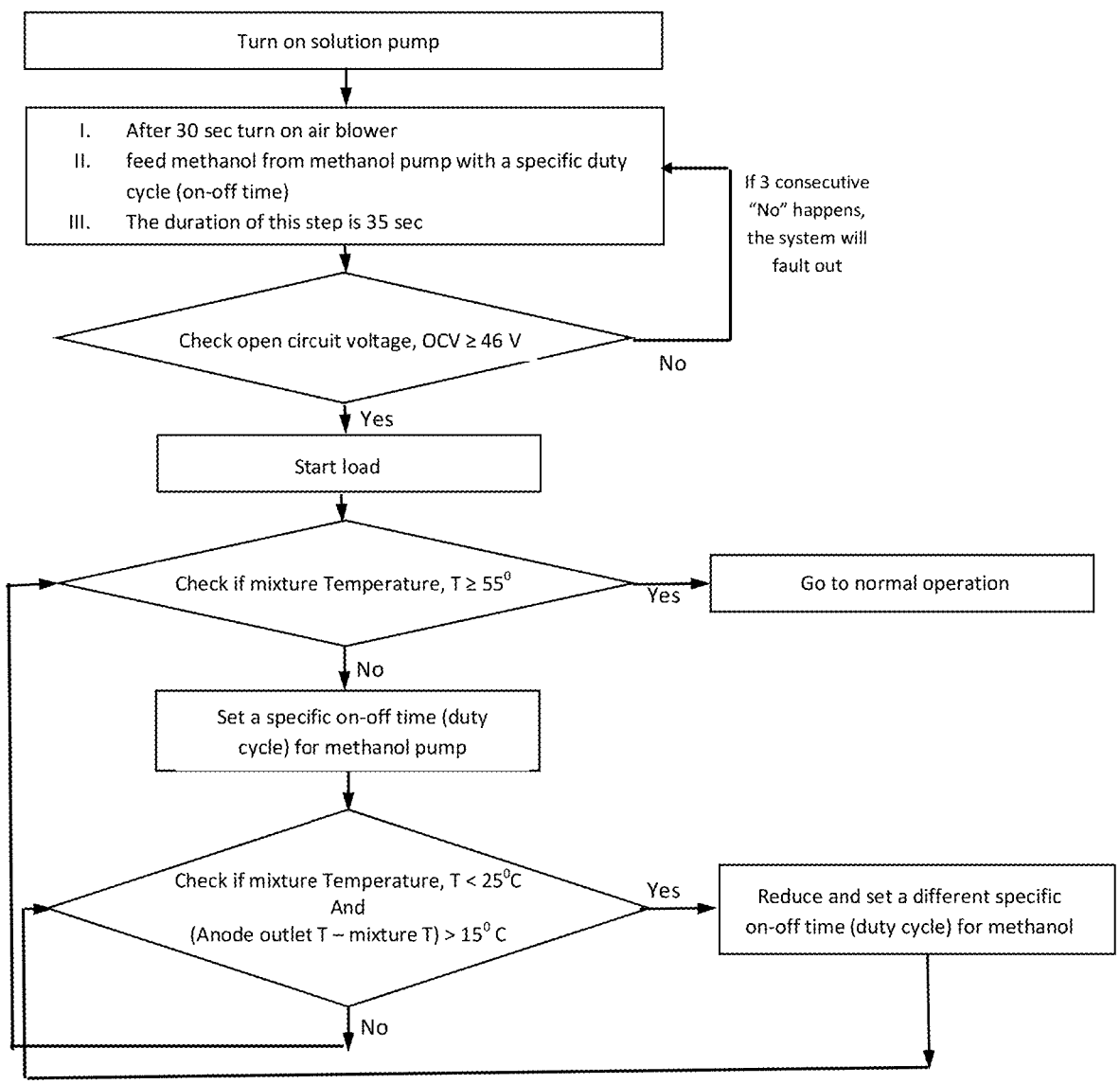
FIG. 9 is an algorithm disclosing an embodiment to control the start-up of a DMFC.

FIG. 9 is an algorithm disclosing this embodiment while FIG. 4 discloses the components used in the method.

Referring to FIG. 4, the "solution pump" corresponds to the "anode circulation pump" while the T anode-in and T anode-out correspond to the temperature sensors used to measure the temperature of the methanol mixture (T anode-in) in step (i) and the anode outlet temperature (T anode-out) in step (j). However, it is to be understood that the temperature of the methanol mixture can be measured anywhere in the anode loop upstream of the anode, e.g in that portion of the anode loop upstream from the anode up to and including the methanol mixing tank.

Referring to FIG. 9, the preliminary duty cycle is 35 seconds. As will be appreciated by those skilled in the art, the length of the duty cycle will depend on a number of factors including the concentration of the methanol source, the flow rate of the methanol pump, the volume of the anode loop and the difference between the methanol concentration in the methanol mixture and the methanol concentration set point.

The OCV in FIG. 9 is identified as greater than or equal to 46 V. However, the OCV will vary depending on whether the DMFC is a single fuel cell or a fuel cell stack as well as the other components of the DMFC such as the composition and thickness of the PEM, the methanol crossover of the PEM etc. In FIG. 9, the "No" logic as it relates to the OCV can result in repeated duty cycles for the methanol pump which will increase the methanol concentration in the anode loop. If this is repeated too many times the methanol concentration may reach levels that may damage the MEA. Although optional, it is preferred that the number of repeated duty cycles be limited to protect the MEA. In FIG. 9, the number of repeated duty cycles is limited to 3. However, the number and length of the duty cycles may vary depending on the DMFC.

Once the predetermined OCV is reached a load is applied to the DMFC to produce a current and to generate heat. The heat from the oxidation of methanol in the DMFC is used to heat the methanol mixture in the anode loop. However, other heat sources such as electrical heaters can be used in the anode loop to hasten the increase in the temperature of the methanol mixture to a predetermined operating temperature. In FIG. 9, the predetermined operating temperature is greater than or equal to 55° C. As with the other DMFC parameters, the optimal operating temperature can be determined empirically. Once the predetermined operating temperature is reached or exceeded, the DMFC goes to normal operation. Such normal operation includes any of those in the prior art as well as any of the above disclosed methods for controlling the methanol concentration.

If the temperature of the methanol mixture is below the predetermined operating temperature, a second duty cycle is performed. The length of time for this second duty cycle is preferably less than the first duty cycle to protect the MEA from high methanol concentrations. Although not shown in FIG. 9, the methanol mixture temperature can be measured after the duty cycle to determine if it has reached the predetermined operational temperature and repeatedly recycled to another second duty cycle if that temperature has not been reached. However, as with the repeated preliminary duty cycles to reach a predetermined OCV, repeated duty cycles to reach a predetermined operating temperature of the methanol mixture can result in high methanol concentrations that can damage the MEA. Accordingly, it is preferred that after the second duty cycle that (i) the temperature of the methanol mixture be determined as well as (ii) the temperature difference between the anode outlet temperature and the methanol mixture temperature be determined. The temperature of the methanol mixture is then compared to a second predetermined temperature which is below the predetermined operating temperature. In FIG. 9 this second predetermined temperature is less than 25° C. This is about room temperature (77° F.) and lower. This temperature is chosen to address situations where the DMFC start-up occurs in relatively low temperatures as compared to the operating temperature. In FIG. 9 the operating temperature is 55° C. (131° F.), however the start-up ambient temperatures may be significantly lower, e.g. 0° C. If this aspect of the algorithm is not used and the temperature of the methanol mixture is below 25° C. (or other empirically determined temperature), repetitive cycling of the second duty can occur resulting in MEA damage. To avoid this the temperature difference between the anode outlet and methanol temperature is measured. This difference provides an indication of the methanol concentration at the anode. In FIG. 9, the difference between the anode outlet temperature and the temperature of the methanol mixture is greater than 15° C. and was empirically determined for the DMFC. In the case of FIG. 9, if the temperature is below 25° C. and the temperature difference between the anode outlet and the methanol mixture is greater than 15°, these conditions indicate that the methanol concentration in the anode loop is potentially reaching levels that can damage the MEA. In response, the algorithm reduces the second duty cycle to protect the MEA and will continue to do so until such conditions are not met. When these conditions are not met, the methanol mixture temperature is compared to the predetermined operational temperature which if met results in normal operation of the DMFC. If not met, a second duty cycle commences until the predetermined operating temperature is met and normal operation of the DMFC is commenced.

EXAMPLES

Anode Outlet Temperature as a Function of Methanol Concentration

DMFC operation is an exothermic reaction phenomenon (heat is produced from the reaction) and its reaction rate depends on methanol concentration. The higher concentration leads to higher heat generation rate. Based on experimental and testing observations we discovered that the anode outlet temperature is a strong function of methanol concentration. The correlation of anode outlet temperature with methanol concentration demonstrates that anode outlet temperature is a methanol concentration dependent parameter of the DMFC. FIG. 5 shows the dependency of anode outlet temperature on methanol concentration.

OCV Decay Slope as a Function of Methanol Concentration

Figure 6:
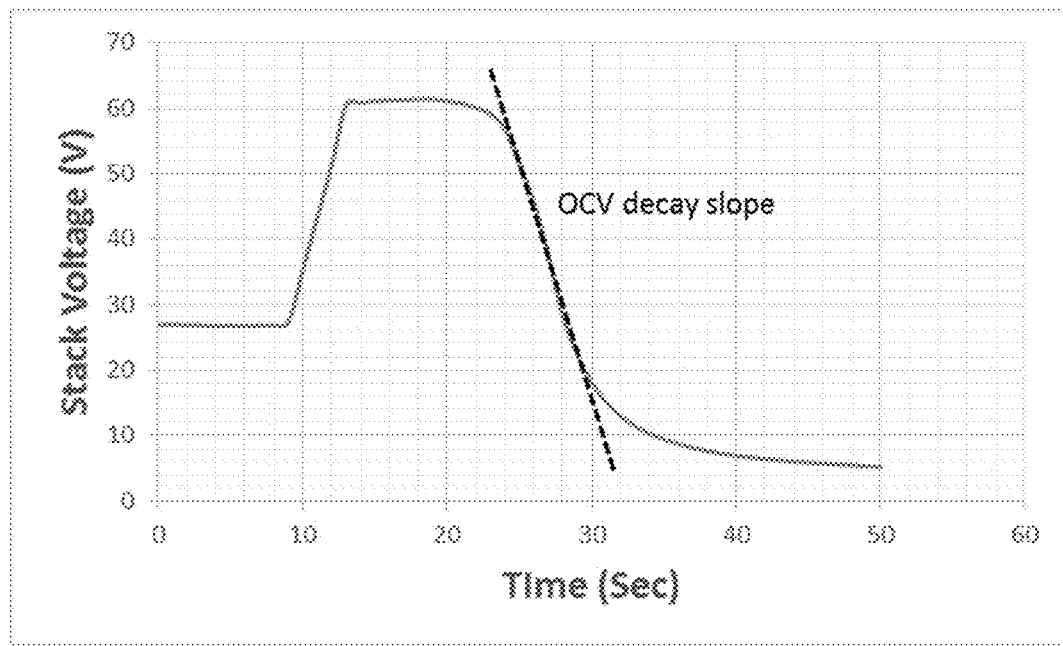
FIG. 6 is a voltage profile of a DMFC from loaded to unloaded operating conditions and shows the open circuit voltage (OCV) decay when oxidant gas is excluded from the cathode.

The concentration of methanol feed in the inlet of direct methanol fuel cell (DMFC) was determined by the open circuit voltage (OCV) response of transient load conditions. The DMFC was tested at several concentrations with a specific anode inlet of 60° C. and 40 A current load. The results showed a strong correlation of open circuit voltage transient response to methanol concentration in the concentration range of 0.60-1.20 M. FIG. 6 represents the load profile that could provide best resolution for methanol concentration determination when the stack is operated from load profile (40 A constant current mode operation) to rest cycle (i.e., no load with anode flow on and air flow turned off). This rest cycle is a practical operating procedure for DMFC system which minimizes on-state cathode catalyst degradation due to catalyst oxidation. This rest cycle comprises: removing the load from the fuel cell stack, allowing the stack voltage to reach OCV and then reapplying the load with no oxygen flow.

Figure 7:
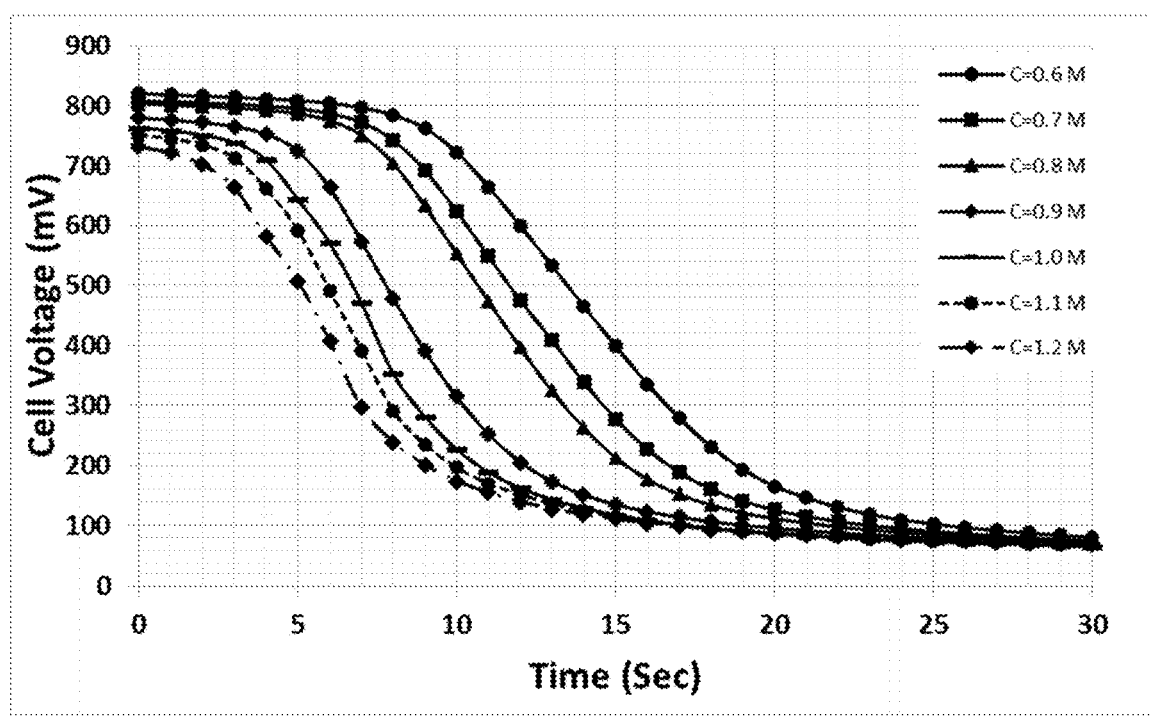
FIG. 7 demonstrates the correlation between methanol concentration and OCV decay slope during the rest cycle of a DMFC.
Figure 8:
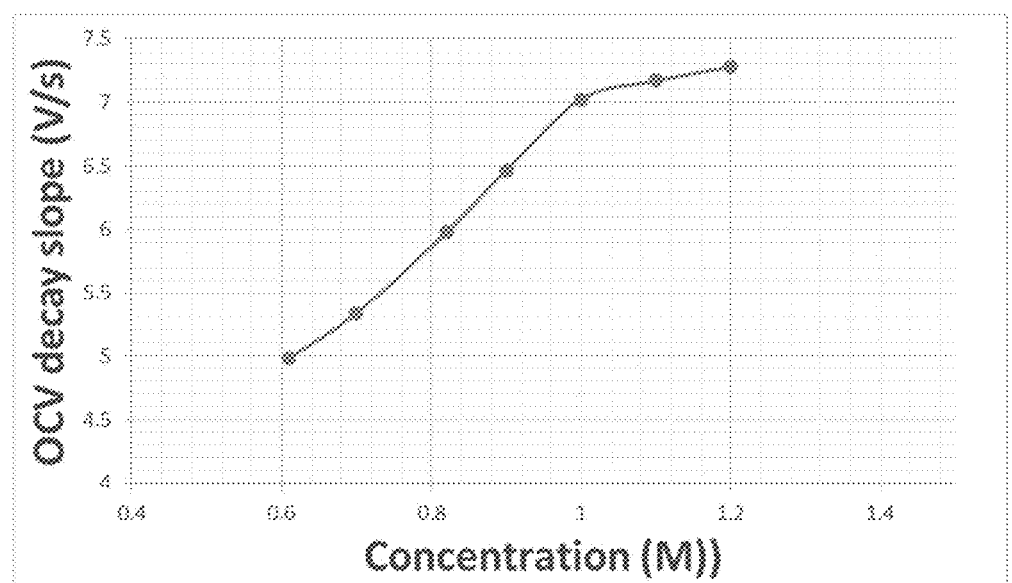
FIG. 8 discloses the OCV decay slope at various methanol concentrations. The operating load was 40 A with a fixed anode inlet temperature of 60° C.

FIG. 7 clearly represents the strong correlation of OCV decay slope with methanol concentrations between 0.6 to 1.2 M.

The variation of OCV response during rest cycle is believed to be driven by consumption of leftover oxygen in cathode. The oxygen is consumed proportionally and subsequently the stack voltage will decay based on the concentration of cathode catalyst layer. FIG. 7 represents the OCV decay slope dependency on methanol concentration.

What is claimed is:

1. A method for controlling the methanol concentration in a direct methanol fuel cell (DMFC) wherein said DMFC comprises an anode, a cathode, a methanol source and a methanol mixing chamber in fluid communication with said methanol source and said anode, wherein said DMFC has a methanol concentration set point for its operation which is lower than the methanol concentration in said methanol source, said method comprising:
   measuring a first methanol concentration of said DMFC by measuring a first methanol concentration dependent parameter of said DMFC;
   measuring a second methanol concentration of said DMFC by measuring a second methanol concentration dependent parameter of said DMFC which is different from said first parameter;
   determining the difference between said first and said second methanol concentrations to generate a positive or negative offset concentration;
   adding said positive or negative offset concentration to said first methanol concentration to produce an adjusted methanol concentration;
   comparing said adjusted methanol concentration to said methanol concentration set point; and
   increasing the methanol concentration in said methanol mixing chamber if said adjusted methanol concentration is less than said methanol concentration set point by transferring methanol from said methanol source to said methanol mixing chamber,
   wherein said first and second methanol concentration dependent parameters are selected from the group consisting of anode outlet temperature, open circuit voltage (OCV) decay slope, the capacitance of said methanol mixture, the speed of sound in said methanol mixture, the refractive index of said methanol mixture, the heat capacity of said methanol mixture, the viscosity of said methanol mixture, the kinematic viscosity of said methanol mixture and the electrochemical properties of said methanol mixture.

2. The method of claim 1 wherein prior to said measuring said second methanol concentration said method further comprises;
   determining if said first methanol concentration is less than said methanol concentration set point;
   increasing the methanol concentration in said methanol mixing chamber if said first methanol concentration is less than said methanol concentration set point by transferring methanol from said methanol source to said methanol mixing chamber.

3. The method of claim 1 wherein said DMFC further comprises a water source in fluid communication with said methanol mixing chamber, wherein if said first methanol concentration or said adjusted methanol concentration is greater than said methanol concentration set point, the methanol concentration is decreased by restricting methanol transfer from said methanol source to said methanol mixing chamber and/or transferring water from said water source to said methanol mixing chamber.

4. The method of claim 1 wherein said DMFC further comprises a water source in fluid communication with said methanol mixing chamber and a level sensor to measure the level the methanol mixture in said methanol mixing chamber; wherein when said level is below a predetermined level, water from said water source is transferred to said methanol mixing chamber.

5. The method of claim 1 wherein said DMFC further comprises a water source in fluid communication with said methanol mixing chamber and a level sensor to measure the level the methanol mixture in said methanol mixing chamber; wherein when said level is above a predetermined level, water transfer from said water source to said methanol mixing chamber is restricted.

6. The method of claim 3 wherein said water source is water produced at said cathode.

7. The method of claim 6 wherein said DMFC further comprises a cathode exhaust port in fluid communication with a cathode radiator which is in fluid communication with said methanol mixer and the atmosphere, wherein said cathode radiator is activated when said level in said mixing tank is below a predetermined level and deactivated when said level in said mixing tank is above a predetermined level.

8. The method of claim 1 wherein said first and second methanol concentration dependent parameters are selected from the group consisting of anode outlet temperature and open circuit voltage (OCV) decay slope.

9. The method of claim 1 wherein one of said first and second methanol concentration dependent parameters is measured periodically.

10. A method for controlling the methanol concentration in a direct methanol fuel cell (DMFC) wherein said DMFC comprises an anode, a cathode, a methanol source and a methanol mixing chamber in fluid communication with said methanol source and said anode, wherein said DMFC has a methanol concentration set point for its operation which is lower than the methanol concentration in said methanol source, said method comprising:
  measuring a first methanol concentration of said DMFC by measuring a first methanol concentration dependent parameter of said DMFC;
  determining if said first methanol concentration is less than said methanol concentration set point;
  increasing the methanol concentration in said methanol mixing chamber if said first methanol concentration is less than said methanol concentration set point by transferring methanol from said methanol source to said methanol mixing chamber;
  measuring a second methanol concentration of said DMFC by measuring a second methanol concentration dependent parameter of said DMFC which is different from said first parameter;
  determining if said second methanol concentration is less than said methanol concentration set point to generate a positive or negative offset concentration;
  adding said positive or negative offset concentration to said first methanol concentration to produce an adjusted methanol concentration;
  comparing said adjusted methanol concentration to said methanol concentration set point; and
  increasing the methanol concentration in said methanol mixing chamber if said adjusted methanol concentration is less than said methanol concentration set point by transferring methanol from said methanol source to said methanol mixing chamber.
  wherein said first and second methanol concentration dependent parameters are selected from the group consisting of anode outlet temperature, open circuit voltage (OCV) decay slope, the capacitance of said methanol mixture, the speed of sound in said methanol mixture, the refractive index of said methanol mixture, the heat capacity of said methanol mixture, the viscosity of said methanol mixture, the kinematic viscosity of said methanol mixture and the electrochemical properties of said methanol mixture.

11. The method of claim 10 wherein said DMFC further comprises a water source in fluid communication with said methanol mixing chamber, wherein if said first or said adjusted methanol concentrations is greater than said methanol concentration set point, the methanol concentration is decreased by restricting methanol transfer from said methanol source to said methanol mixing chamber and/or transferring water from said water source to said methanol mixing chamber.

12. The method of claim 10 wherein said DMFC further comprises a water source in fluid communication with said methanol mixing chamber and a level sensor to measure the level the methanol mixture in said methanol mixing chamber; wherein when said level is below a predetermined level, water from said water source is transferred to said methanol mixing chamber.

13. The method of claim 10 wherein said DMFC further comprises a water source in fluid communication with said methanol mixing chamber and a level sensor to measure the level the methanol mixture in said methanol mixing chamber; wherein when said level is above a predetermined level, water transfer from said water source to said methanol mixing chamber is restricted.

14. The method of claim 12 wherein said water source is water produced at said cathode.

15. The method of claim 14 wherein said DMFC further comprises a cathode exhaust port in fluid communication with a cathode radiator which is in fluid communication with said methanol mixer and the atmosphere, wherein said cathode radiator is activated when said level in said mixing tank is below a predetermined level and deactivated when said level in said mixing tank is above a predetermined level.

16. The method of claim 10 wherein said first and second methanol concentration dependent parameters are selected from the group consisting of anode outlet temperature and open circuit voltage (OCV) decay slope.

\* \* \* \* \*